UNITED STATES PATENT OFFICE 2,606,200

THERAPEUTIC PRODUCTS

Edward J. Matson, North Chicago, and Le Roy W. Clemence, Highland Park, Ill., assignors to Abbott Laboratories, North Chicago, Ill., a corporation of Illinois No Drawing. Application March 4, 1950, Serial No. 147,758

14 Claims. (Cl. 260—442)

Our invention relates to therapeutic products and includes among its objects and advantages new therapeutic compositions effective against diseases including coccidiosis in fowls.

Coccidiosis is an infectious diarrhea caused by a small protozoan organism which multiplies very rapidly in the intestines of diseased fowls. Young chickens and turkeys are known to be particularly susceptible. For a long time after the disease was known and after several species of the organism had been specifically identified, it was still considered that, under ordinary circumstances, treatment of diseased birds was out of the question, and sanitation to prevent spread of the infection was the sole expedient relied on to combat the disease.

Our invention comprises amine salts of a phenylarsonic acid of the formula

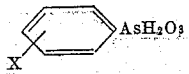

wherein X is a member selected from the class consisting of halogen, hydroxyl, amino and nitro groups; said amine being selected from the group consisting of lower alkyl, lower alkanol and amino-substituted-lower-alkyl-amines. The best results in the treatment of coccidiosis have been found wherein X is a halogen atom and in particular when X is in the para position. The most satisfactory amines have been the lower-alkyl-glucamines, methylglucamine in particular; and the lower alkanolamines, such as ethanolamine in particular; and ethylenediamine. Of these, methylglycamine has been the most satisfactory while ethanolamine is particularly suitable because of its lower cost.

EXAMPLE 1

*Methylglucamine salt of p-bromophenyl-arsonic acid*

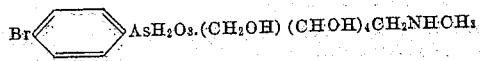

To a solution of about 39 parts (0.2 mol) of methyl glucamine in 200 parts of water there is added, with stirring, 56.2 parts (0.2 mol) of p-bromophenylarsonic acid. The mixture is filtered to remove a small amount of insoluble material and added to 200 parts of methanol. This mixture is added with stirring to 2,000 parts of acetone. A gummy, sticky mass separates from which the solvents are decanted. The gum is then dissolved by warming in 250 parts of methanol and the solution is filtered and the filtrate added gradually with stirring to 1,500 parts of acetone. This precipitates the material as a crystalline powder which is filtered and washed with acetone and dried in vacuum to secure a yield of 77.6 parts. The theoretical analysis is N 2.93%, as 15.75%. Analysis of the particular batch recited above gives N 2.90%, As 16.0%.

EXAMPLE 2

*Methylglucamine salt of p-chlorophenyl-arsonic acid*

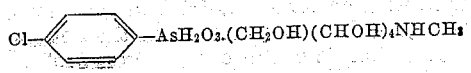

Approximately 13 grams (0.055 mole) of p-chlorophenylarsonic acid is added to solution of 11 grams (0.055 mole) of methylglucamine dissolved in 75 cc. of methanol. The mixture is dissolved by heating and stirring. The solution is filtered while hot and added to 400 cc. of acetone with constant stirring. The precipitate which forms tends to be gummy. The precipitate is triturated further with more acetone and the solid filtered off and washed with acetone. The powder formed is dried in a vacuum drier. The product has a melting point of 131 to 132° C., with decomposition. The theoretical arsenic content for the compound is 17.45%. The analysis of the above material shows that it contains 17.91% arsenic.

EXAMPLE 3

*Monoethanolamine salt of p-chlorophenyl-arsonic acid*

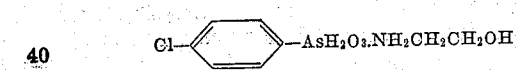

Approximately 13.0 grams (0.055 mole) of p-chlorophenylarsonic acid is added with stirring to a solution of 3.4 grams (0.055 mole) of monoethanolamine dissolved in 75 cc. of methanol. Solution is obtained upon warming of the mixture. The solution is filtered and poured with stirring into 350 cc. of acetone. A white crystalline precipitate forms which is filtered and washed with acetone. This crystalline material is then dried in a vacuum drier. The product has a melting point of 135 to 136° C. The theoretical arsenic content for the above compound is 25.21% arsenic and the analysis of the product shows it to contain 25.09% arsenic.

EXAMPLE 4

*Ethylenediamine salt of p-chlorophenylarsonic acid*

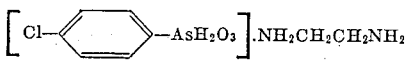

About 15.0 grams of (0.055 mole) p-chlorophenlyarsonic acid is added with stirring to a solution of 6.6 grams (0.11 mole) of ethylenediamine dissolved in a mixture of 50 cc. of methanol and 15 cc. of water. The mixture dissolves upon warming and the solution is filtered and added with stirring to 350 cc. of acetone. A white crystalline precipitate forms, which is filtered and washed well with acetone. After drying in a vacuum drier, this precipitate has a melting point of 218–9° C., with decomposition. The theoretical arsenic content for the above compound is 28.14%, and upon analysis this material is found to contain 27.81% arsenic.

EXAMPLE 5

*Monoethanolamine salt of p-bromophenylarsonic acid*

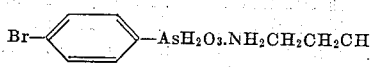

To 12.2 parts (0.2 mol) of monoethanolamine in 100 parts of methanol there is added 56.2 parts (0.2 mol) of p-bromophenylarsonic acid with stirring and a clear solution results on warming which is filtered and the filtrate added with stirring to 750 parts of acetone. This gives a precipitate which is filtered off and thoroughly washed with acetone and dried in vacuum to secure a yield of 60.2 parts. The theoretical analysis for arsenic in this compound is 21.93% and analysis of the sample gives 21.97%.

EXAMPLE 6

*Monoethanolamine salt of o-chlorophenylarsonic acid*

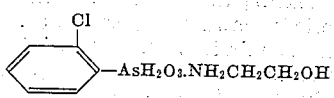

About 13.0 grams (0.055 mole) of o-chlorophenylarsonic acid is added to a solution of 3.4 grams (0.055 mole) of monoethanolamine dissolved in 75 cc. of methanol. Solution is obtained upon stirring. The solution is filtered and added dropwise with stirring to 350 cc. of acetone. A crystalline precipitate forms which is filtered off and washed with more acetone. The precipitate is dried in a vacuum drier. The melting point is 154–5° C. The theoretical nitrogen content is 4.70% and the arsenic percentage is 25.21 for the above compound. Analysis shows the material to contain 24.50% arsenic and 4.68% nitrogen.

EXAMPLE 7

*Monoethanolamine salt of m-chlorophenylarsonic acid*

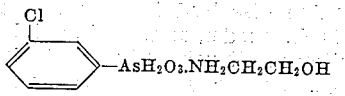

About 6.5 grams (0.028 mole) of m-chlorophenylarsonic acid is added to the solution of 1.7 grams (0.028 mole) of monoethanolamine dissolved in 40 cc. of methanol. Solution is obtained by stirring. The solution is filtered and added dropwise with stirring to 175 cc. of acetone. A crystalline precipitate is formed which is filtered and washed with acetone. After drying in a vacuum drier, the compound has a melting point of 132–3° C. The theoretical nitrogen and arsenic contents for the above compound are 4.70% nitrogen and 25.21% arsenic. Analysis of the material shows that it contains 4.81% nitrogen and 24.75% arsenic.

EXAMPLE 8

*Methylglucamine salt of m-chlorophenylarsonic acid*

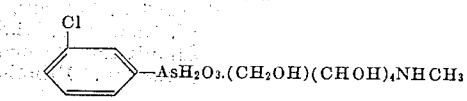

About 6.5 grams (0.028 mole) of m-chlorophenylarsonic acid is added to a solution of 5.5 grams (0.028 mole) of methylglucamine suspended in 40 cc. of methanol. Solution of the mixture is obtained by stirring and warming. The solution is filtered and added dropwise with stirring to 200 cc. of acetone. The precipitate which forms is filtered off and washed with acetone. After drying in a vacuum drier, the material has a melting point of 182–3° C., with decomposition. The theoretical nitrogen arsenic contents are 3.24% nitrogen and 17.38% arsenic. Upon analysis, the material is found to contain 3.52% nitrogen and 17.01% arsenic.

EXAMPLE 9

*Ethylenediamine salt of o-chlorophenylarsonic acid*

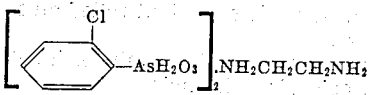

About 6.5 grams (0.028 mole) of o-chlorophenylarsonic acid is suspended in 30 cc. of methanol and to it is added 3.3 grams (0.055 mole) of ethylenediamine. A clear solution is obtained upon warming, which is filtered and added with stirring in 250 cc. acetone. A white precipitate is obtained which is filtered and washed with acetone. After drying in a vacuum drier, the material has a melting point of 217–8° C., with decomposition. The theoretical arsenic content for the above compound is 28.14% while the analytical value is found to be 27.54% arsenic.

EXAMPLE 10

*Ethylenediamine salt of p-bromophenylarsonic acid*

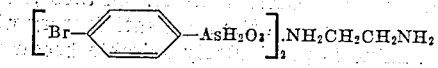

To 10.2 parts (0.17 mol) of ethylenediamine in 150 parts of methanol, there is added 47.7 parts (0.17 mol) of p-bromophenylarsonic acid with stirring. A solution is not obtained, even on boiling, and a test sample showed incomplete solubility when diluted with water. An additional 9.5 parts of ethylenediamine is added to the alcoholic suspension. This mixture does not result in complete solution on boiling, but a test sample did show complete solubility on dilution with water.

Thirty-five parts of water are added to the hot alcohol mixture and a clear solution obtained. This solution is filtered hot and added with stirring to 900 parts of acetone and a precipitate is secured. The precipitate is filtered and washed with acetone and dried in vacuum to secure a yield of 45.5 parts. The theoretical analysis for arsenic in this compound is 24.20% and an analysis of the product gave 24.23%.

EXAMPLE 11

*Methylglucamine salt of 3-nitro-4-hydroxyphenylarsonic acid*

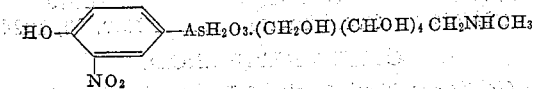

A solution is made up of 39.5 parts (0.15 mol) of 3-nitro-4-hydroxyphenylarsonic acid in 200 parts of methanol, and the solution is filtered to make it entirely clear. A second solution is made up of 29.3 parts (0.15 mol) of methylglucamine and 350 parts of hot methanol. The second solution is added quickly with stirring to the first solution and then 2,000 parts of acetone are quickly added with continued thorough stirring. This results in the immediate formation of a slightly gummy precipitate which quickly became crystallized. The mass is allowed to stand about two hours and filtered and the precipitate is washed with acetone and transferred immediately to a vacuum desiccator and dried. There is secured a yield of 67 parts of a water soluble crystalline compound. The theoretical analysis for arsenic is 16.37% and test analysis of the batch gives 16.24%.

EXAMPLE 12

*Monoethanolamine salt of arsanilic acid*

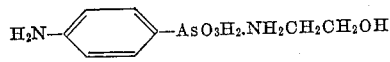

43.4 grams (0.2 mole) of arsanilic acid (p-aminophenylarsonic acid) is added with stirring and heating to a solution of 12.2 grams (0.2 mole) of monoethanolamine in 100 cc. of methyl alcohol. The mixture is warmed until a clear solution is obtained. The solution is then filtered and cooled. The cold solution is added gradually with stirring to 600 cc. of dioxane. The crystalline precipitate is filtered and washed with dioxane and dried in a vacuum. The theoretical analysis for arsenic is 26.97% and analysis of the sample is 26.3%.

In the preparation of the alkylenediamine salts, it has been found necessary to add more than the theoretical amount of alkylenediamine to effect solution. Although only one mole is theoretically required for 2 moles of the phenylarsonic acid derivative, we have found it advisable to use several times the required amount of alkylenediamine. The exact nature of this phenomenon is unknown to us but presumably it is necessary to have an excess of the diamine due to some intermediate formation. It should be noted, however, that the salt which is formed is the salt containing two moles of the phenylarsonic acid derivative to 1 mole of the alkylenediamine.

We have also found that other numerous amines will provide salts having desirable properties. For example, other alkanolamines such as n-propanolamine and n-butanolamine have proven quite satisfactory. When p-chlorophenylarsonic acid is used, the compounds formed are the n-propanolamine salt of p-chlorophenylarsonic acid and the n-butanolamine salt of p-chlorophenylarsonic acid, respectively. Other amino-substituted-lower-alkyl-amines may be used such as n-propylenediamine, diethylenetriamine and n-butylenediamine. When p-chlorophenylarsonic acid is used, the compounds formed are the n-propylenediamine salt of p-chlorophenylarsonic acid, the diethylenetriamine salt of p-chlorophenylarsonic acid and the n-butylenediamine salt of p-chlorophenylarsonic acid, respectively. The lower alkyl amines have been found satisfactory also, such as ethylamine, n-propylamine and n-butylamine. The compounds formed with p-chlorophenylarsonic acid are the ethylamine salt of p-chlorophenylarsonic acid, the n-propylamine salt of p-chlorophenylarsonic acid, and the n-butylamine salt of p-chlorophenylarsonic acid, respectively.

METHOD OF ADMINISTRATION

Compounds of the class exemplified by the foregoing examples are best administered to chicks by dissolving the compounds of the invention in the drinking water of fowl or mixing it with feed. We have found that concentrations of between 0.0005% and 0.05% are satisfactory for the control of coccidiosis. We have found that the most satisfactory and efficient concentration is that of approximately 0.005%. It is also within the ambit of our invention to supply solutions and feed in the form of compositions containing the compounds of the invention in an inert diluent such as water, feed, or other inert diluent. Such compositions could be supplied directly to the fowl-raiser in the concentrations indicated above. Alternately, the compounds would be supplied in the form of a tablet containing the salts of the present invention in more concentrated form and in an amount which could be conveniently diluted with a suitable amount of water.

This application is a continuation-in-part of our prior application Ser. No. 682,926, filed July 11, 1946, now abandoned.

Others may readily adapt the invention for use under various conditions of service by employing the features of novelty disclosed or their equivalents. It will be obvious that the disclosure contemplates the availability of compounds of this type for other inventions to which they may be applicable. As at present advised with respect to the apparent scope of our invention, we desire to claim the following subject matter.

We claim:

1. An amine salt of a phenylarsonic acid of the formula $$\underset{X}{\underset{|}{\text{}}}\underset{}{\bigcirc}\text{—AsH}_2O_3$$

where X represents a halogen atom, said amine being selected from the group consisting of lower alkyl, lower alkanol and amino-substituted-lower-alkyl-amines.

2. A hydroxy-substituted-lower-alkyl-amine salt of halo-phenylarsonic acid.

3. A hydroxy-substituted lower alkyl amine salt of para-halophenylarsonic acid.

4. A lower alkyl glucamine salt of halo-phenylarsonic acid.

5. A lower alkyl glucamine salt of para-halophenylarsonic acid.

6. The methylglucamine salt of halo-phenylarsonic acid.

7. The methylglucamine salt of para-halophenylarsonic acid.

8. An alkylenediamine salt of halo-phenylarsonic acid.

9. An alkylenediamine salt of para-halophenylarsonic acid.

10. The methylglucamine salt of p-bromophenylarsonic acid.

11. The methylglucamine salt of p-chlorophenylarsonic acid.

12. The monoethanolamine salt of p-chlorophenylarsonic acid.

13. The ethylenediamine salt of p-chlorophenylarsonic acid.

14. The monoethanolamine salt of p-bromophenylarsonic acid.

EDWARD J. MATSON.
LE ROY W. CLEMENCE.

REFERENCES CITED

The following references are of record in the file of this patent:

UNITED STATES PATENTS

| Number | Name | Date |
|---|---|---|
| 2,274,593 | Despois | Feb. 24, 1942 |
| 2,476,890 | Morehouse | July 19, 1949 |

FOREIGN PATENTS

| Number | Country | Date |
|---|---|---|
| 224,764 | Great Britain | Nov. 20, 1924 |

OTHER REFERENCES

Goddard: Text Book of Inorganic Chemistry, vol. XI, part II, pages 156 and 159. Charles Griffen and Co., Limited, London, 1930.